US007024055B2

(12) United States Patent
Newman

(10) Patent No.: US 7,024,055 B2
(45) Date of Patent: Apr. 4, 2006

(54) SPARSE REPRESENTATION OF EXTENDED GAMUT IMAGES

(75) Inventor: Todd Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 10/032,488

(22) Filed: Jan. 2, 2002

(65) Prior Publication Data
US 2003/0123722 A1 Jul. 3, 2003

(51) Int. Cl.
G06K 9/60 (2006.01)
G06K 9/00 (2006.01)

(52) U.S. Cl. .................................. 382/305; 382/162
(58) Field of Classification Search ................ 382/162, 382/166, 305; 345/541–547, 589–590; 358/1.9, 358/443, 444, 523
See application file for complete search history.

(56) References Cited

U.S. PATENT DOCUMENTS

| 5,559,954 | A | * | 9/1996 | Sakoda et al. ............... 345/546 |
| 5,909,220 | A | * | 6/1999 | Sandow ....................... 345/589 |
| 6,282,311 | B1 | | 8/2001 | McCarthy et al. ........... 382/162 |
| 6,282,312 | B1 | | 8/2001 | McCarthy et al. ........... 382/162 |
| 6,282,313 | B1 | * | 8/2001 | McCarthy et al. ........... 382/162 |
| 6,285,784 | B1 | | 9/2001 | Spaulding et al. ........... 382/162 |
| 6,335,983 | B1 | * | 1/2002 | McCarthy et al. ........... 382/162 |
| 6,342,951 | B1 | * | 1/2002 | Eschbach et al. ............. 358/1.9 |
| 6,741,746 | B1 | * | 5/2004 | Epstein et al. ............... 382/233 |
| 6,748,107 | B1 | * | 6/2004 | Fushiki et al. ............... 382/162 |
| 6,754,384 | B1 | * | 6/2004 | Spaulding et al. ........... 382/167 |
| 6,774,953 | B1 | * | 8/2004 | Champion et al. ........... 348/651 |
| 6,822,760 | B1 | * | 11/2004 | Spaulding et al. ............ 358/1.9 |

FOREIGN PATENT DOCUMENTS

EP 1 118 963 7/2001

* cited by examiner

Primary Examiner—Andrew W. Johns
Assistant Examiner—Amir Alavi
(74) Attorney, Agent, or Firm—Fitzpatrick, Cella, Harper & Scinto

(57) ABSTRACT

Data storage format for storing images with extended color gamut that is compatible with limited color gamut imaging devices includes identifying regions within the color image that contain extended gamut color values, using a compact notation to store an identification of each extended color gamut region in a second section, gamut-mapping the image data pertaining to the extended gamut regions to a limited gamut color space, storing the gamut-mapped image data together with all image data not in an extended gamut region in a first section of the data storage format, and storing image data for the extended gamut regions in an extended gamut color space in a third section of the data storage format such that the limited color gamut image stored in the first section can be combined with the extended gamut data stored in the third section to produce an extended color gamut digital image.

9 Claims, 7 Drawing Sheets

SPARSE REPRESENTATION OF EXTENDED GAMUT IMAGES

BACKGROUND OF THE INVENTION

1. Field of the Invention

The present invention relates to storage formats for image data and in particular, to storage formats that allow efficient representation of images with extended color gamuts, while maintaining compatibility with legacy hardware and software that have limited color gamuts.

2. Description of the Related Art

The gamut of an imaging system refers to the range of colors that can be produced or represented by that system. Many imaging devices, such as cameras and printers, can capture and/or produce colors that are outside the gamut of a standard cathode ray tube ("CRT"), which stores data in an RGB color space with 8 color bits for each of a red, green and blue channel. The mismatch between the RGB color gamut and the color gamuts of other output devices and image sources represents a serious limitation on the usefulness of the RGB color space. Nevertheless, for many applications it is convenient to store, display and manipulate a digital image in a particular storage color space that is well-suited for the work flow associated with that application. Additionally, many software applications that are available to manipulate images on a computer are designed to work with images in an RGB color space.

Because there will generally be colors in an extended color gamut digital image that can not be represented in an RGB color space, use of this color space will come at the expense of applications that can utilize the extended color gamut information that may have existed in an input image. Yet 8 bit per channel RGB images have long been a de facto standard. With the introduction of IEC's sRGB standard, they have become a de jure standard as well.

To overcome this problem, proposals have been made for creating an RGB color space with extended gamut. Most of these proposals require the use of more than 8 bits per color channel. For example, the IIIA's esRGB proposal uses the same three primaries and maintains compatibility with sRGB within the 8 bit range, but then extends the gamut by allowing code values less than zero and greater than one. Other proposals, like Kodak's RIMM and ROMM RGB, move the three primaries farther from white point. Kodak's proposal supports 8, 10, and 12 bits per color channel. The 8 bit encoding is not compatible with sRGB, and achieves a wider gamut at the cost of noticeable quantization levels within the image. The IEC'S scRGB requires 16 bits per color channel and uses a linear luminance encoding rather than a linear brightness encoding.

The problem with these proposals is that images encoded using them cannot be displayed properly on legacy equipment. Images that use more than 8 bits per channel will be completely unrecognizable. Images encoded using a signed representation will be almost as bad. Values in the images near zero will appear at mid-level brightness; negative values will shift their relationship to the device primaries; that is, those that were farther from device white than the device primaries will suddenly become closer to device white. Therefore these proposals fail to develop an image representation that allows representation of colors that are outside a CRT monitor gamut, but are still compatible with legacy hardware and software.

More recently, patents assigned to Kodak, such as U.S. Pat. No. 6,282,313 to McCarthy et al entitled "Using a Set of Residual Images to Represent an Extended Color Gamut Digital Image", describe a method for representing a digital image having color values with an extended color gamut by adjusting the color values of an extended gamut image to form a limited color gamut digital image and determining a set of residual images to represent the difference between the extended color gamut digital image and the limited color gamut digital image. The residual images and the limited color gamut digital image can then be used to form a reconstructed extended color gamut digital image.

These methods suffer from lack of accuracy in that the calculated residual image is subject to round off errors in performing subtractions. They are also inefficient due to the large storage space that is required for storage of both the limited color gamut digital image and the residual image.

SUMMARY OF THE INVENTION

It is an object of the present invention to provide an efficient and accurate image representation method that allows for representation of an image with an extended color gamut, while remaining compatible with limited gamut hardware and software.

In one aspect, the present invention is a data storage format which stores image data in three sections: a first section for storing a gamut-mapped version of the image that fits within a limited gamut color space, a second section for storing information identifying those regions within the image that have extended gamut color values, and a third section for storing extended gamut data for those regions identified by the second section.

To generate data for storage in the format of the invention, a color image with potentially extended gamut color values is examined for the purpose of detecting those regions within the image where color values with extended gamuts exist. A definition of each of these regions is then stored in the second section of the data storage format using a compact notation. Image data pertaining to the extended gamut regions are gamut-mapped to a color space having a limited color gamut. The gamut-mapped image data are stored, along with all image data not in an extended gamut region, in a first section of the data storage format. Image data for the extended gamut regions are stored in an extended gamut format in a third section of the data storage format. Image data stored in the first and third sections are merged using information stored in the second section in order to reconstruct an extended gamut image.

Use and display of image data according to the inventive data storage format for storing digital color images depends on whether the image data is displayed on a legacy color CRT or is being used in connection with other color image processing which is compatible with extended gamut data. For legacy systems, image data in the first section is used exclusively. For use in color image processing that accepts extended gamuts, the color image data is recreated from the information in all three sections.

Because the data storage format proposed by the invention represents the extended gamut image by storing portions of the original image that have an extended color gamut, it requires less storage space than the Kodak methods that store a difference image, which includes zeros corresponding to the limited gamut portions of the original image. In addition, because the inventive method does not perform a subtraction, it is faster and not subject to round-off errors that result from the computation and representation of the difference.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
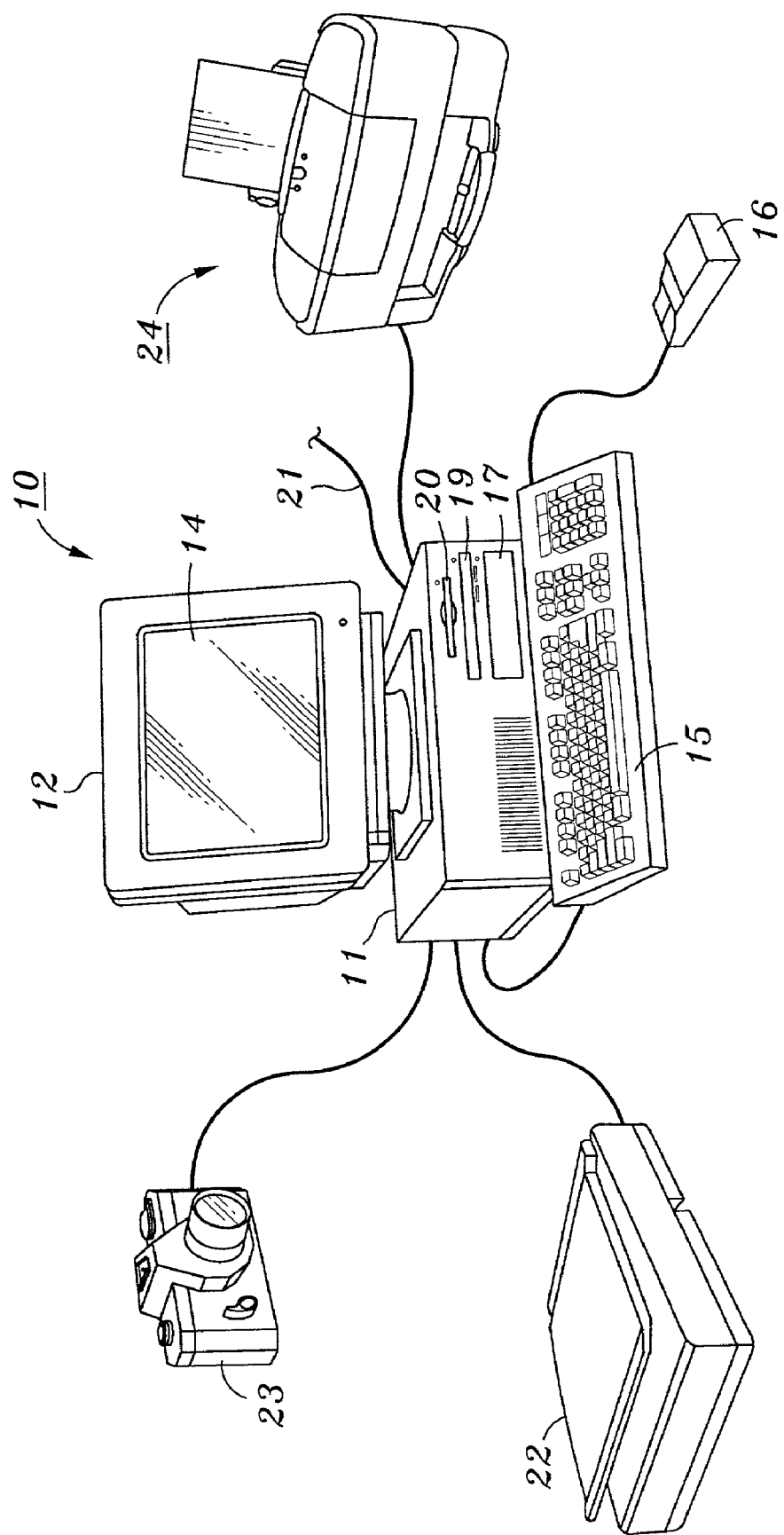
FIG. 1 is a view illustrating the outward appearance of a representative embodiment of the present invention.

FIG. 1 is a view showing the outward appearance of a representative embodiment of the invention. Computing equipment 10 includes host processor 11 comprising a personal computer (hereinafter "PC") preferably having a windowing operating system such as Microsoft Windows, Xwindows or MacIntosh operating systems. Provided with the computing equipment 10 are color monitor 12 including display screen 14, keyboard 15 for entering text data and user commands, and pointing device 16. Pointing device 16 preferably comprises a mouse, for pointing, selecting and manipulating objects displayed on display screen 14.

Computing equipment 10 includes a computer-readable memory medium such as a fixed disk 17 and/or floppy disk drive 19 and/or CD-ROM drive 20. Such computer readable memory media allow computing equipment 10 to access information such as image data, computer executable process steps, application programs, and the like, stored on removable and non-removable memory media. In addition, network access 21 allows computing equipment 10 to acquire information, images and application programs from other sources, such as a local area network or the Internet.

Scanner 22 scans original images such as original color photographs or color documents to provide image information to computing equipment 10. Image capture device, such as a video camera or a digital video camera 23, captures original images and transmits them to computing equipment 10. Printer 24 is a color output device such as an ink jet printer or a color laser beam printer, for example.

Figure 2:
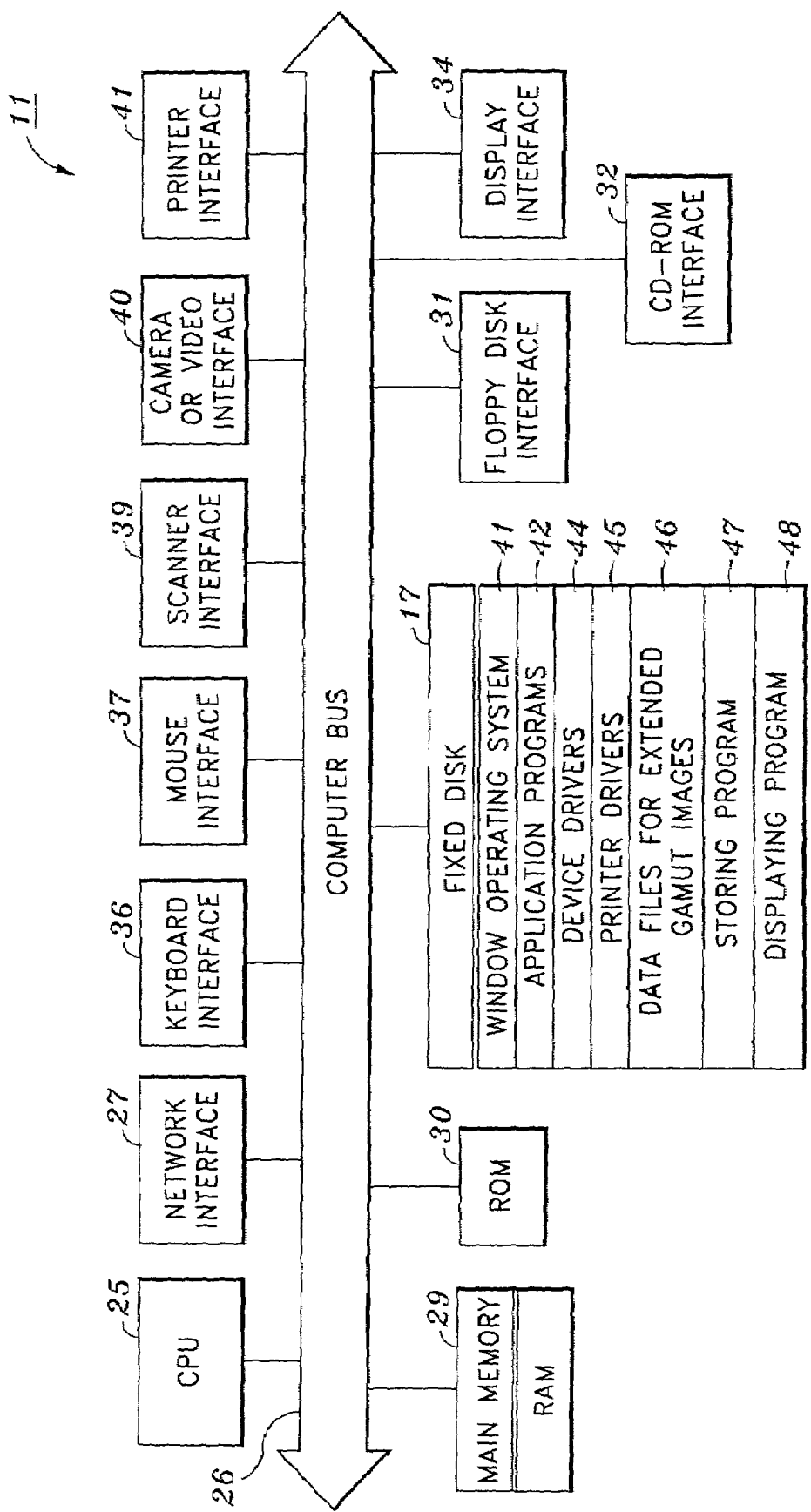
FIG. 2 is a detailed block diagram of the computing equipment shown in FIG. 1.

FIG. 2 is a detailed block diagram showing the internal architecture of PC 11. As shown in FIG. 2, PC 11 includes central processing unit ("CPU") 25 that interfaces with computer bus 26. Also interfacing with computer bus 26 are fixed disk 17, network interface 27 for network access 21, random access memory ("RAM") 29 for use as main memory, read only memory ("ROM") 30, floppy disk interface 31, CD-ROM interface 32, display interface 34 to monitor 12, keyboard interface 36 to keyboard 15, mouse interface 37 to pointing device 16, scanner interface 39 to scanner 22, digital camera interface 40 to digital camera 23, and printer interface 41 to printer 24.

Main memory 29 interfaces with computer bus 26 so as to provide RAM storage to CPU 25 during execution of software programs such as the operating system, application programs, and device drivers. More specifically, CPU 25 loads computer-executable process steps from disk 17 or other memory media into a region of main memory 29, and thereafter executes the stored process steps from main memory 29 in order to execute software programs. Data such as color images can be stored in main memory 29, where the data can be accessed by CPU 25 during execution.

As also shown in FIG. 2, fixed disk 17 contains a windowing operating system 41, application programs 42 such as application programs that manipulate, obtain and print color images, device drivers 44 such as printer driver 45, data files for extended gamut images 46, program for storing data in data files 47, and program for displaying data contained in the data files 48.

Figure 3:
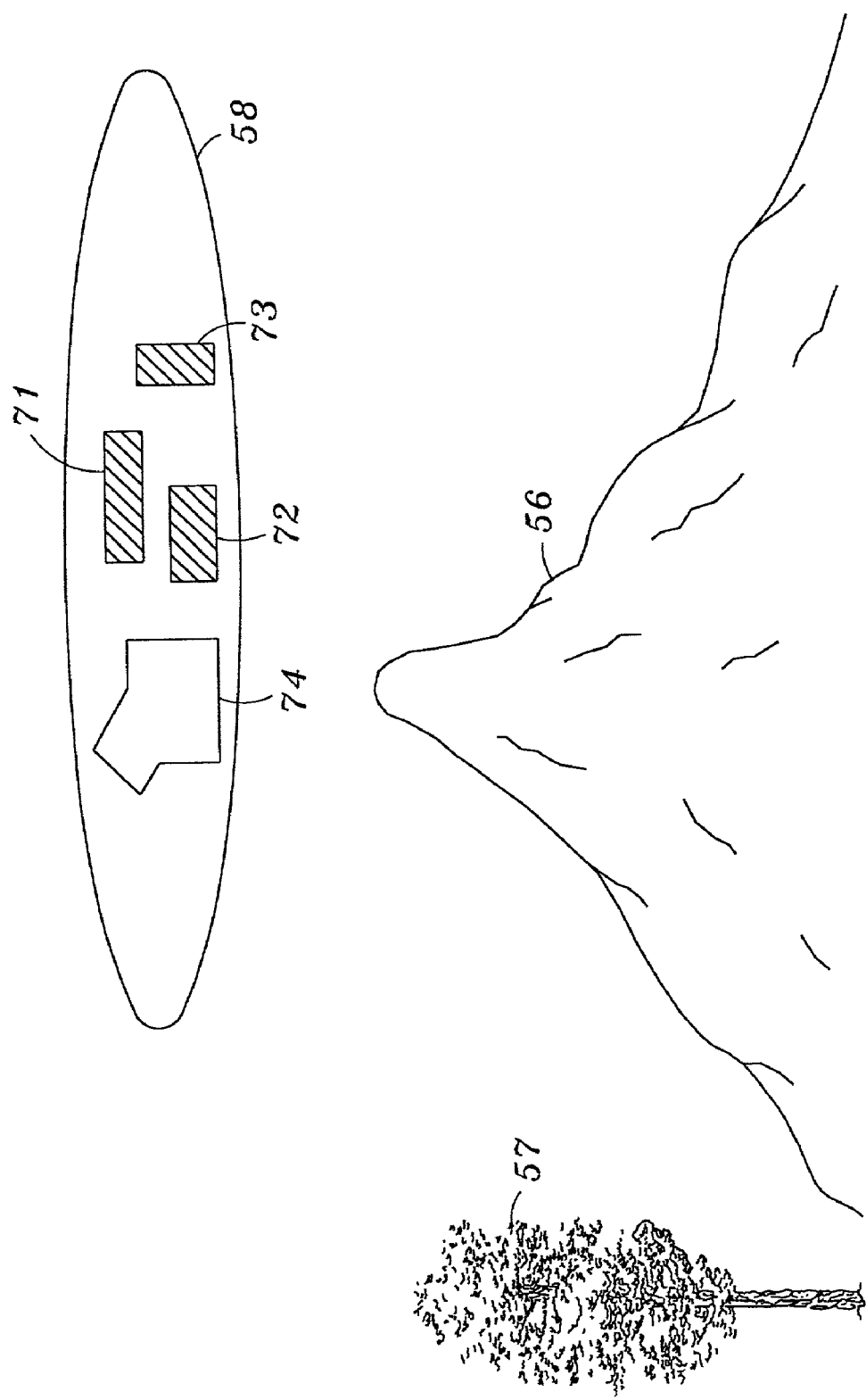
FIG. 3 is a representative original image including standard sRGB gamut regions and extended gamut regions.

FIG. 3 is a representative original image that includes regions whose pixels are within a standard sRGB gamut, and regions in which at least some pixels fall outside a standard sRGB gamut. These latter regions are hereinafter referred to as "extended gamut" regions. The objects depicted in FIG. 3 represent a mountain 56 and a tree 57 against the backdrop of an intense blue sky contained inside an oval 58. It is well-known that most natural images contain few pixels that are outside the sRGB gamut as most colors found in nature are not strongly saturated. Areas pertaining to the mountain 56 and the tree 57 do not contain extended gamuts pixels; whereas areas inside the oval 58, such as those identified by rectangles 71, 72 and 73, and the irregular geometrical FIG. 74, contain some extended gamut pixels.

Figure 4:
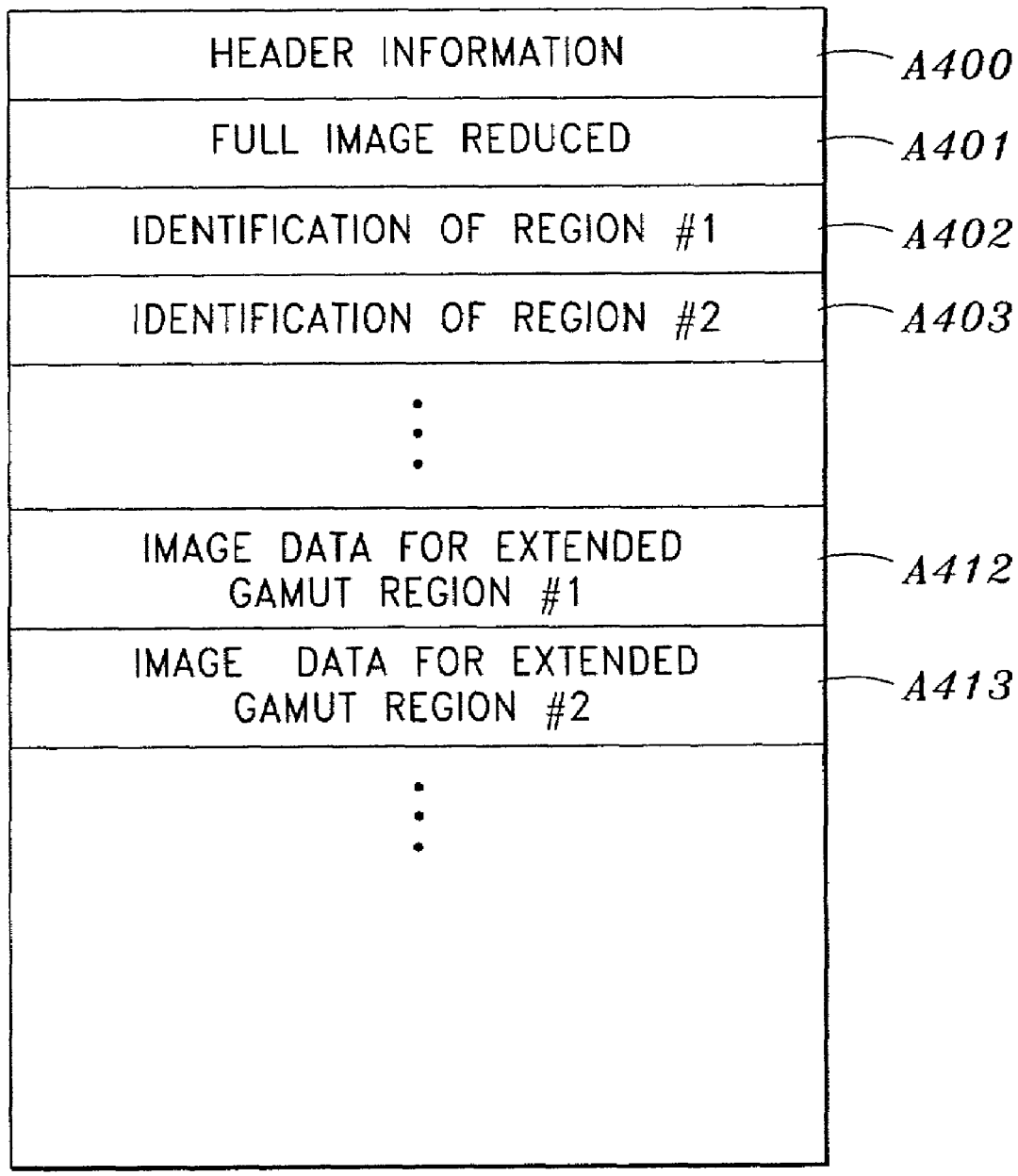
FIG. 4 is a functional block diagram of the content of the data storage format of the present invention.

FIG. 4 is a functional block diagram showing the content of the data storage format of the present invention. Header information, containing such information as source and destination addresses, and error checking, for example, is provided in area A400 of the data storage format. Y bands identifying extended gamut regions are discussed more fully in discussion of FIG. 6. Area 401 of the data storage format indicates the number of Y bands that corresponding to the extended gamut regions. Area A401 of the data storage format contains a version of the original image that is gamut-reduced to a standard sRGB gamut by being subjected to gamut mapping. The gamut mapping transforms extended gamut pixels to standard sRGB gamut pixels. The result is a standard sRGB gamut version of the original image that is stored in A401 of the data storage format.

The original color image, with extended gamut color values, is examined for the purpose of detecting extended gamut regions, i.e., regions within the image where color values fall outside a standard sRGB gamut. A definition of each of these extended gamut regions is stored in the data storage format. Area A402 of the data storage format stores identification of a first extended gamut region of the original image. Area A403 of the data storage format stores identification for a second extended gamut region of the original image. This pattern, shown by the dotted line below area 403 of FIG. 4, continues until identification for all extended gamut regions are stored in the data storage format.

Image data for the region identified in A402 of the data storage format is stored in area A412 of the data storage format. Image data for the region identified in A403 of the data storage format is stored in area A413 of the data storage format. The above pattern of storing image data for extended gamut regions identified in A402, A403, etc., in areas A412, A413, etc. of the data storage format is repeated until all image data pertaining to the extended gamut regions are stored in the data storage format. This pattern is shown by the broken line below area A413 in FIG. 4. The collection of data stored in areas A412, A413, etc. of the data storage format is referred to here as the "sparse image."

Preferably, the sparse image is encoded in CIELAB relative to the D65 monitor white point used in sRGB. This will facilitate the task of relating pixels in the gamut-reduced image to the sparse image pixels for the purpose of reconstructing an extended gamut image. Preferably, a compressed version of the sparse image is attached to the reduced gamut image of step S701 as a private image tag. The data storage format described above is preferably compatible with file formats such as JFIF (for JPEG files) and TIFF that support use of private image tags. The reduced-gamut version of the image is compatible with legacy software and hardware, which will ignore the private image tag. The extended gamut information that is stored in the private image tag remains available for use in imaging systems that can utilize the extended gamut information.

Figure 5:
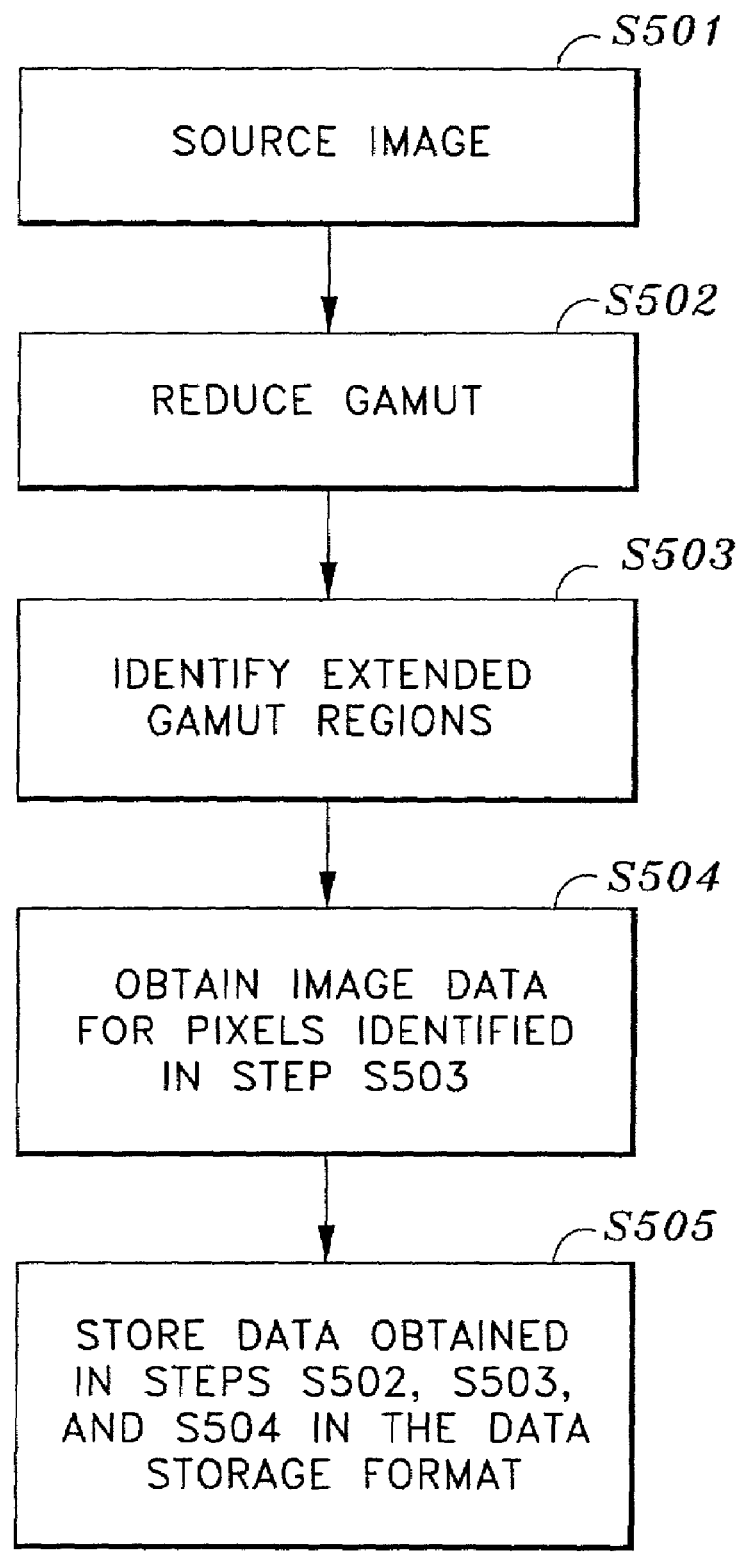
FIG. 5 is a flow diagram showing the steps involved in creating a data storage format in accordance with the present invention.

FIG. 5 is a flow diagram describing the steps involved in creating a data storage format in accordance with the present invention. The original image data of step S501 is image data that has an extended color gamut such as an image from a scanner 22, or an image captured by an image capture device such as a digital camera or a digital video camera 23. The original image is gamut mapped at reduce gamut step S502 so as to yield a reduced gamut version of the original image that would fit into a standard sRGB gamut color space. Gamut-mapping is a well-known technique by which colors in a color image that are not reproducible by an output device are mapped to reproducible colors, while preserving the perception of good color fidelity and colorfulness. Any gamut mapping technique can be used to map the original extended gamut image to the standard sRGB gamut of a legacy device.

Step S503 identifies extended gamut regions of the original image such as those described below in connection with FIG. 6. In step S504 image data corresponding to the region identified in step S503 is obtained. The sparse image resulting from the combination of the image data for all extended gamut regions is preferably encoded in CIELAB relative to the D65 monitor white point used in sRGB in order to facilitate relating of pixels in the reduced gamut image to the corresponding sparse image pixels. The reduced gamut version of the original image of step S502, the identification of extended gamut regions of the original image of step S503, and the sparse image data of step S504, are stored in the data storage format in step S505.

FIG. 6 shows an application of an YX banding technique that is preferably used to identify extended gamut regions of the original image. A region is divided into a "YX-banded" array of rectangles. This array imposes two degrees of order. First, all rectangles are sorted by top side y coordinate first, and then by left side x coordinate. Furthermore, the rectangles are grouped into "bands". Each rectangle in a band has the same top y coordinate, and each has the same bottom y coordinate. Thus all rectangles in a band differ only an to their X coordinate values. The YX banding representation does not minimize rectangles. In particular, if a rectangle vertically crosses a band, then the rectangle may be broken down into two or more smaller rectangles stacked one atop the other.

Preferably, the rectangles cover as much area as possible so that no two rectangles within a band touch. Whenever possible, bands will be merged together to cover a greater vertical distance (and thus reduce the number of rectangles). Two bands can be merged only if the bottom of one touches the top of the other and they have rectangles in the same places. As described more fully below, the Y bands are preferably formed by determining where the number of extended gamut pixels in a scan line changes.

Rectangles 71, 72 and 73 represent extended gamut areas of the original image and correspond to regions 71, 72 & 73 in FIG. 3. Starting at the top, line one starts at y1, which is where the number of extended gamut pixels in the scan line goes up from zero due to presence of extended gamut area 71 in the scan line. Line two starts at y2, where the number of extended gamut pixels drops back to zero. Line three starts at y3 and marks the beginning of extended gamut area 73. A line will also start when there is more than one extended gamut region on a scan line. Therefore line four starts at y4, where extended gamut region 72 starts and extended gamut region 73 continues. Line five starts at y5, where the number of extended gamut pixels drops back to zero.

The Y bands and the X blocks within a band are preferably represented with a simple data structure whereby each Y band describes its starting and ending scan line and the number of X blocks within the band. Each X block preferably describes the starting and ending pixel and also contains an offset number that describes the relative position of the X block relative to the first X block. The following is a representation of this data structure in "C" programming language:

The representation starts with a count of the Y bands:

| unsigned int | nYbands |
|---|---|

Each Y band is represented as:

| unsigned int | Ystart; | |
|---|---|---|
| unsigned int | nLines; | /* number of scanlines */ |
| unsigned int | nXblocks; | |

Accordingly, a Y band starts at position ystart, continues for nLines number of lines, and contains nXblocks number of X blocks. There are nLines*nX extended gamut pixels in each extended gamut region.

Each X block is represented as:

| unsigned int | Xstart; |
|---|---|
| unsigned int | nX; |
| unsigned int | offsetpixels; |

Accordingly, an X block starts at position xstart, continues for nx number of pixels, and is offset by offsetpixels from the first X block of the first Y band.

Figure 6A:
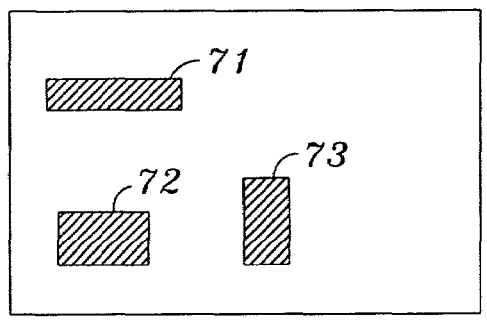
FIG. 6 shows an application of YX banding technique to identify the extended gamut regions of the original image.
Figure 6B:
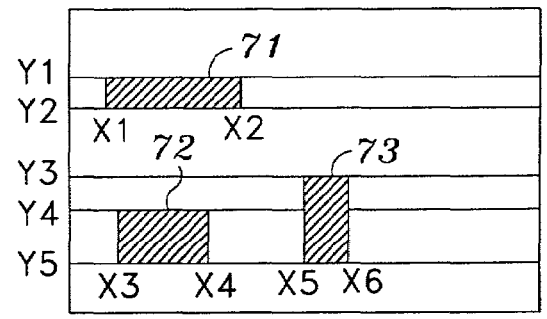
Figure 6C:
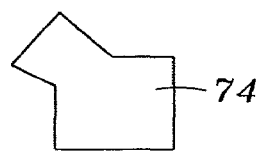
Figure 6D:
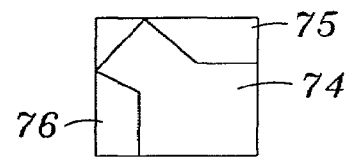

Although the above described structure is suitable for situations where the extended gamut regions are rectangles, such images are seldom found in nature. For the more typical irregularly shaped regions, such as area 74 shown in FIG. 6C corresponding to region 74 shown in FIG. 3, the number of extended gamut pixels on each scan line would change and there would therefore be a wide band for each scan line within that region, resulting in a longer processing time. These irregular clusters are preferably detected and bound by a box 75, as shown in FIG. 6D that would fit within a YX band. The bounding box 75 may contain some reduced gamut pixels that would be treated as extended gamut pixels, 76. The drawback in storage of data for the additional number of pixels must be balanced against the extra storage required for the YX banding information and the resulting extra processing time.

Although the preferred embodiment utilizes YX banding to identify extended gamut areas of the original image, other techniques may be employed in lieu of the YX banding technique to identify the extended gamut regions.

Figure 7:
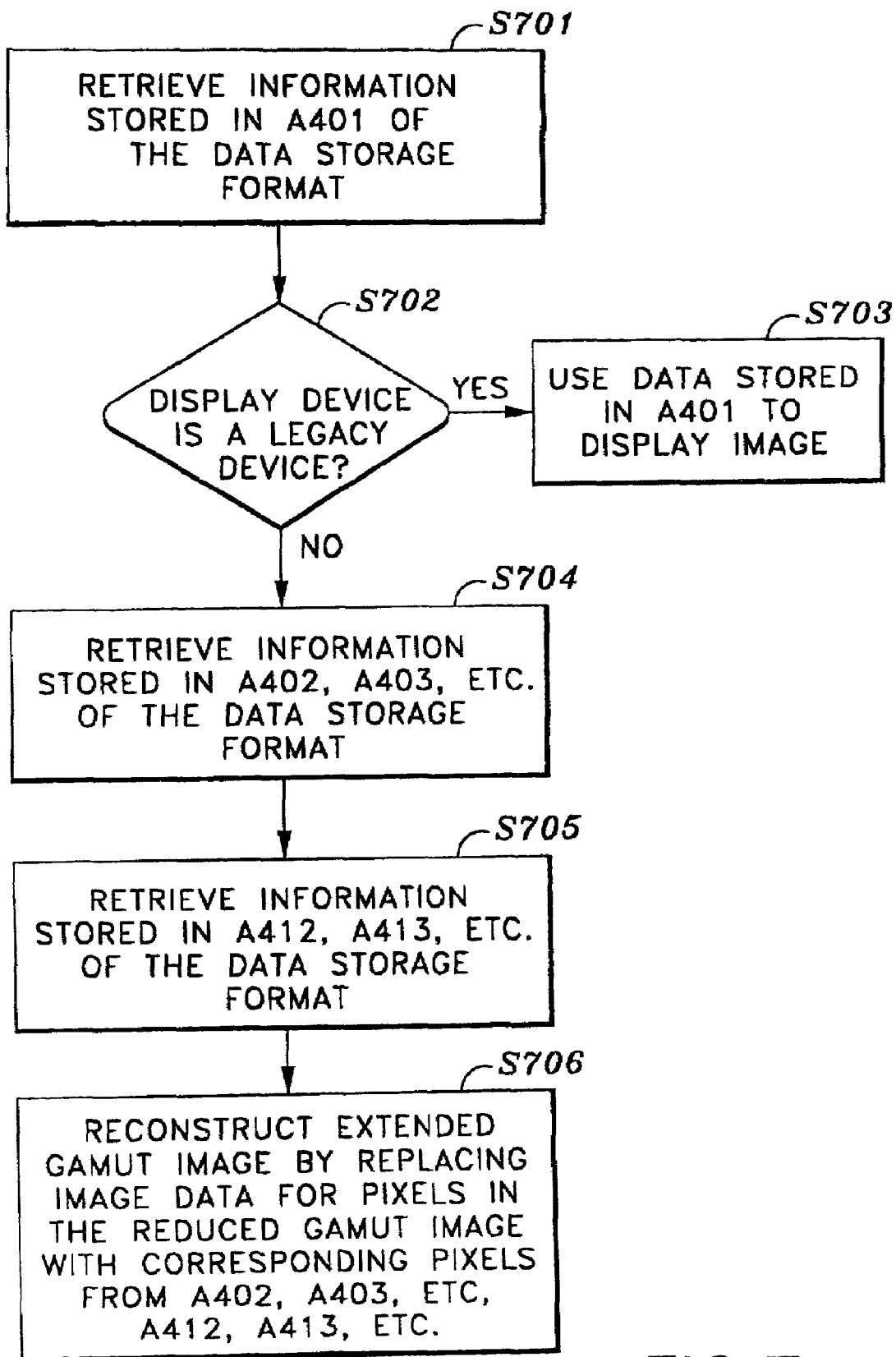
FIG. 7 provides an illustration of a preferred technique for display of the original image in accordance with the present invention.

FIG. 7 is a flow diagram which provides an illustration of a preferred technique for display of the original image in accordance with the present invention. In step S701 the information stored in area A401 of the data storage format, which corresponds to the reduced gamut version of the original image, is retrieved. Step S702 inquires into whether the reconstructed image is to be displayed on a legacy device, i.e., one that is not capable of displaying pixels with extended gamut color values, or an extended gamut device that is compatible with extended gamut color values. Should the display device be determined to be a legacy device, step S703 uses the information stored in area A401 of the data storage format, and retrieved through step S701, to display a reduced gamut version of the original image on the legacy device. For use of the image data in conjunction with devices with extended gamut capabilities, data identifying the extended gamut regions of the original image that are stored in areas A402, 3, etc. of the data storage format, are retrieved in step S704. Step S705 retrieves image data for the extended gamut region identified in step S704 from areas A412, 13, etc. of the data storage format.

An extended gamut image is reconstructed in step S706 by replacing image data for pixels in the reduced gamut version of the original image, retrieved though step S701, with image data for the corresponding pixels from the sparse image recovered through steps S704 and S705.

Preferably, a compressed version of the data identifying the extended gamut regions of the original image and a compressed version of the sparse image are attached to the reduced gamut image of step S701 as a private tag. The tag, while ignored by legacy software, can be used by software for extended gamut devices in order to reconstruct an extended gamut image from the reduced gamut version of the original image and the sparse image. The data storage format is compatible with current file formats and current processing software. File formats like JFIF (for JPEG files) and TIFF support use of private image tags. The reduced gamut version of the original image is compatible with legacy software and hardware, which will simply ignore the private image tags. The extended gamut information that is stored in the private tag remains available for future use in those imaging systems that can utilize the extended gamut information.

Preferably, the sparse image is encoded in CIELAB relative to the D65 monitor white point used in sRGB. This will facilitate the task of relating pixels in the reduced gamut image to the sparse image. Pixels in the reduced gamut image are preferably converted from RGB to CIEXYZ using a 1D look-up table and 3×3 matrix defined in the sRGB specification. They are then converted to CIELAB using the standard formula described in the prior art document CIE 15.2.

The first preferred embodiment works well when the image is to be used in a color managed workflow where the device independent CIELAB, or a simple transformation of it, such as CIELCH, is the working space for the color management system. For color management systems that use a different device independent color appearance space such as CIECAM 97s or IPT, the sparse image is preferably stored in that different color appearance space. For a particular color space, various encodings of an image would be possible. For example, an image in CIELAB color space could be encoded via a 16 bit fixed point (8 bits on either side of the binary point) or a 32 bit IEEE floating point. All such variations are understood to be modifications of the present embodiment and within the scope of the present invention.

In a second embodiment of the present invention the sparse image is encoded in an extended gamut RGB space, such as one of those mentioned above. This embodiment would be most useful if there was support in the operating system for that extended gamut color encoding. Under such circumstances the reduced gamut image would be converted from sRGB to an extended gamut RGB such as scRGB color space. The sparse image would then be merged with the reduced gamut version of the original image to reconstruct an extended gamut destination image.

While the invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. Data storage format stored on a computer-readable memory medium, for storing color image with extended gamut color values that is compatible with limited color gamut imaging systems comprising:

a first section for storing color values of the color image in a limited gamut color space;

a second section for storing information identifying image regions that have color values out of the limited gamut; and a third section for storing the extended gamut color values for the image regions that are identified by the information stored in the second section.

2. The data storage format described in claim 1, wherein the color values stored in a first section of the data storage format are stored in a JFIF format.

3. The data storage format described in claim 1, wherein the color values stored in a first section of the data storage format are stored in a TIFF format.

4. The data storage format described in claim 1, wherein the color values stored in a third section of the data storage format are stored in a compressed format.

5. The data storage format described in claim 4, wherein the color values stored in a third section of the data storage format can be added to the color values stored in a first section of the data storage format as a private tag.

6. Method for using data stored in data storage format including a first section for storing color values of the color image in a limited gamut color space, a second section for storing information identifying image regions that have color values out of the limited gamut, and a third section for storing the extended gamut color values for the image regions that are identified by the information stored in the second section, said method comprising:

utilizing the color values stored in the first section of the data storage format in connection with a first color processing device which is incompatible with extended gamut data, without utilizing data stored in the second and third sections; and utilizing data stored in all three sections of the data storage format in connection with a second color image processing device which is compatible with extended gamut data.

7. The method defined in claim 6, wherein the extended gamut color values stored in the third section of the data storage format are attached to the color values stored in a first section of the data storage format as a private tag.

8. The method defined in claim 6, wherein the private tag is ignored by a legacy device that is incompatible with extended gamut image color values.

9. The method defined in claim 8, wherein the private tag and the color values stored in the first section of the data storage format are utilized by a device that is compatible with extended gamut image color values.

* * * * *